United States Patent [19]

Jessop

[11] Patent Number: 5,541,685
[45] Date of Patent: Jul. 30, 1996

[54] EMULSION SIDE BACKER SUPPORT PLATE ASSEMBLY FOR MAGNETICS-ON-FILM READ/WRITE HEAD

[75] Inventor: Thomas C. Jessop, Webster, N.Y.

[73] Assignee: Eastman Kodak Company, Rochester, N.Y.

[21] Appl. No.: 387,668

[22] Filed: Feb. 13, 1995

[51] Int. Cl.⁶ .................................................. G03B 17/24
[52] U.S. Cl. ................................................ 354/106; 355/40
[58] Field of Search ........................ 354/75, 76, 105, 354/106; 355/40, 41; 360/1, 3, 130.3, 130.31, 130.32, 130.33

[56] References Cited

U.S. PATENT DOCUMENTS

| | | | |
|---|---|---|---|
| 3,747,938 | 7/1973 | van der Hilst et al. | 360/130.31 |
| 3,984,049 | 10/1976 | Shawen | 235/486 |
| 4,271,441 | 6/1981 | Greiner et al. | 360/130.33 |
| 4,330,802 | 5/1982 | Kato et al. | 360/96.6 |
| 4,337,493 | 6/1982 | Kagano | 360/130.33 |
| 4,380,035 | 4/1983 | Ota et al. | 360/130.33 |
| 4,392,169 | 7/1983 | Boullart et al. | 360/130.33 |
| 4,573,095 | 2/1986 | Bordignon | 360/130.33 |
| 4,669,020 | 5/1987 | Shepherd et al. | 360/130.32 |
| 4,731,687 | 3/1988 | Kagano et al. | 360/132 |
| 4,747,007 | 5/1988 | Ikebe et al. | 360/132 |
| 4,761,701 | 8/1988 | Oishi | 360/130.33 |
| 4,780,782 | 10/1988 | Bordignon | 360/130.31 |
| 4,933,780 | 6/1990 | Wash et al. | 360/1 |
| 5,016,030 | 5/1991 | Dwyer et al. | 354/21 |
| 5,034,836 | 7/1991 | DeMarti, Jr. et al. | 360/104 |
| 5,041,933 | 8/1991 | DeMarti, Jr. et al. | 360/104 |
| 5,142,427 | 8/1992 | Kogan | 360/130.3 |
| 5,274,522 | 12/1993 | Taillie | 360/130.3 |
| 5,285,324 | 2/1994 | Weigand et al. | 360/3 |
| 5,285,325 | 2/1994 | Kiesow | 360/3 |
| 5,307,100 | 4/1994 | Kubo | 354/105 |

*Primary Examiner*—Howard B. Blankenship
*Attorney, Agent, or Firm*—Joseph F. Breimayer

[57] ABSTRACT

A magnetic read/write head and backer plate assembly particularly for use for recording and reading information on a magnetics-on-film (MOF) layer in the image area of photographic filmstrips. The backer plate assembly overcomes the loss of compliance of the MOF layer to a head gap when the filmstrip is wrapped about the contoured surface of the magnetic head sufficiently to exceed the bending moment of the filmstrip. A relatively movable backer plate has a support region that assumes the contoured surface shape on engagement with the filmstrip emulsion layer opposite to the magnetic head and is curved until restrained at its free ends and restrained at a location in the support region opposite to the head gap by a resilient pad to thereby restore compliance along the line of contact of the head gap.

11 Claims, 4 Drawing Sheets

EMULSION SIDE BACKER SUPPORT PLATE ASSEMBLY FOR MAGNETICS-ON-FILM READ/WRITE HEAD

FIELD OF THE INVENTION

This invention relates to magnetic record and/or reproduce heads for use for recording or writing and reading information on a magnetics-on-film (MOF) layer in of photographic filmstrips and particularly to an emulsion side backer support for achieving high magnetic read/write head compliance with the relatively stiff filmstrip and thin MOF layer in cameras or other filmstrip handling apparatus.

BACKGROUND OF THE INVENTION

In commonly assigned U.S. Pat. Nos. 4,933,780 and 5,016,030, a photographic filmstrip having a virtually transparent, magnetic film layer on the non-emulsion side of the filmstrip (referred to as an MOF layer) is disclosed in conjunction with various camera systems. One or more longitudinal read/write tracks are illustrated in the MOF layer between the side edges of the image frame area and the filmstrip information such as film type, film speed, film exposure information and information relevant to the processing and subsequent use (e.g., printing) of the exposed image frames is imprinted during manufacture of the filmstrip cartridge. The cameras disclosed therein provide for reading and/or recording of information on these tracks during camera use. The information recorded during camera use may include voiced messages or sound associated with the photographed scene and may be recorded in digital or analog format on certain of the tracks. It is contemplated that both the pre-recorded and any camera user recorded information will be read out for control and reprint purposes during photofinishing.

Commonly assigned U.S. Pat. Nos. 5,034,836, 5,041,933, 5,274,522, 5,285,324 and 5,285,325 and further U.S. Pat. No. 5,307,100 disclose magnetic recording head configurations for use in recording in longitudinal tracks alongside the filmstrip edges but not in the image frame area. These patents showing magnetic recording heads along the edges of the filmstrip outside the image area generally teach providing pressure pad supports or rollers on the emulsion side opposite from the recording heads and continuous motion of the recording medium to ensure reliable compliance for recording and/or reproducing information.

Reading and writing or recording information on tracks of a magnetic coating or stripe of a MOF layer is complicated by the low magnetic density of the semi-transparent magnetic film layer, the need to avoid damage to the filmstrip and the MOF layer, and the characteristics of the photographic filmstrip base and emulsion layers, the need to maintain alignment of the magnetic heads with the edge tracks and, in a still camera, the need for low cost, miniaturization and battery energy conservation.

Photographic film is of much greater thickness than the magnetic tape used for commercial and consumer recording and reproduction and is neither compliant nor inherently flat. When removed from its cartridge, a filmstrip shows a relatively high stiffness and very observable cross-curvature across its width that is convex on the non-emulsion side of the film. Further, the unwrapped filmstrip also shows a convex curvature along its length, again on the non-emulsion side of the film. This latter curvature is attributed primarily to a core-set curl that results from the filmstrip having been tightly wound on a film cartridge spool.

The cross-film curvature across the width of the filmstrip is primarily caused by the number of multilayers of emulsion and MOF layer (if present). The emulsion multilayers (and MOF layer, if present) have different stretch properties than that of the base film substrate of acetate, PET, or PEN material. The cross-film curvature is also influenced by the bending phenomena known as anticlastic curvature. The degree of cross-film curvature also depends on environmental conditions, including the time and temperature history of the film, the relative humidity, and the thickness of the film. Because of the cross-curvature, it is difficult to achieve good contact or compliance across the width of a wide, multi-head array. To provide a reliable read or write signal, the magnetic recording head must remain in close proximity to the magnetic coating. Any disturbances, such as variations in film curl, can vary the relationship of the recording head to the magnetic coating and decrease the reliability of the signal.

In addition, the location of the side edge tracks is typically between image frame related sprocket holes or perforations which cause localized distortion of the filmstrip curl. In the photofinishing context, filmstrips may be spliced together, and the spliced ends may be laterally offset. The magnetic head suspension assemblies of the '836, '933, '324 and '325 patents are intended to accommodate the cross-film curvature, perforation disturbances, and splicing and other edge irregularities by allowing rotatable an/or lateral movement of the head element(s) and, in some cases, relative movement of the head elements with respect to one another.

Certain of these head suspension assemblies also employ a backer element to bear against the emulsion side of the filmstrip opposite to the magnetic head region of contact with the MOF layer to achieve sufficient compliance for recording and reproducing. In the '325 patent, reference is made to the '324 patent and a spring loaded biasing means or backer device for exerting force on the emulsion side to bias the MOF layer of the filmstrip against the magnetic read/write head. Other backer devices are disclosed in the '522, '030 and '100 patents, for example.

Backer plates, rollers, pads and the like are well known in the magnetic recording field for obtaining sufficient compliance of the magnetic media to the read/write head. Alternative means for biasing a magnetic recording web substantially into contact with a magnetic reading and/or recording element include resilient pressure pads and/or leaf springs. Representative of prior art in this instance are U.S. Pat. No. 3,984,049 issued Oct. 5, 1976 to Shawen and U.S. Pat. No. 4,780,782 issued Oct. 25, 1988 to Bordignon. The '049 patent discloses resilient pads which are positioned to be formed in a curved manner between a double curved leaf spring and a stationary frame. The leaf spring bows out and bears against one side of a magnetic web or tape in two locations to urge the other side of the tape against a magnetic read head and a magnetic recording head spaced along the length of the magnetic tape. The leaf spring ends and center point are secured to the stationary frame so that only limited deflection of the centers of curvature of the two bowed out sections are possible depending on the spacing of the fixed magnetic heads and the thickness of the tape or other media.

The '782 patent discloses a leaf spring or reed element which engages a magnetic tape and presses the tape toward a magnetic read/write head when the magnetic read/write head is moved from a retracted position into a position to read/write position. The leaf spring is shaped to conform in the working portion thereof as closely as possible to the curved shape of the head when it is advanced. The middle zone of the working portion is weakened by cut-outs or the like in order to reduce the pressure that, it is asserted, would otherwise be too high at the centrally located head gap.

In magnetic tape recording, the compliance between the read/write head gap and the magnetic coating is simplified by the density of the magnetic coating and the flexibility of the tape. Spacing between the head gap and the magnetic layer due to loss of compliance can be tolerated. Consequently, the reduction in compliance and spacing of the magnetic tape from the head gap proposed in the '782 patent to free up the tape transport may be tolerated for high density magnetic tape.

However, in the photographic filmstrip bearing the MOF layer described above, the density of the virtually transparent magnetic layer is considerably lower, and the film base and emulsion layer are less flexible than magnetic tape base. The handling characteristics of such a filmstrip require magnetic read/write head suspension allowing a differing degree of freedom of movement in order to accurately align with the MOF layer tracks, particularly along the filmstrip edge tracks.

Because of the low magnetic density of the MOF layer and the susceptibility of the emulsion side to scratching and damage, it is of particular importance that the read/write head-to-film interface must have high compliance and avoid scratching the MOF layer or the emulsion layers. As a result, extreme care must be taken in the design of the components of the interface to ensure that a minimum of surface damage occurs at the magnetic head interface and any load supporting member on the emulsion side of the film. Continued improvement in this area remains highly desirable.

PROBLEMS TO BE SOLVED BY THE INVENTION

The invention is directed to solving the above stated problems of recording and reproducing information on MOF layers of a filmstrip in a camera or in other filmstrip processing, handling or other apparatus while avoiding damage to the filmstrip. In addition, the invention is directed to achieving enhanced compliance of an edge track or tracks of a filmstrip MOF layer particularly with a read magnetic head while allowing the filmstrip image area to be unsupported and thereby not subjected to potential scratching.

SUMMARY OF THE INVENTION

It is therefore a primary object of the invention to enhance the compliance of a magnetic read/write head with the MOF layer of a filmstrip for recording and/or reproducing information accurately in one or more parallel tracks in the MOF layer of a photographic filmstrip.

It is a further object of the present invention to provide a system for achieving a high degree of compliance of a multi-head array extending across the filmstrip in such a fashion that the compliance to the multi-head array is enforced via an external compliant backer means that equalizes forces applied from the emulsion side of the filmstrip against a curved magnetic read/write head so that the MOF layer is urged into compliance with the centrally disposed magnetic head gap.

The invention is realized in a first aspect in a magnetic read/write apparatus e.g. a photographic camera or a filmstrip photofinishing processor or printer, for receiving an elongated filmstrip having a substantially transparent magnetic layer deposited on the film surface and for recording or reproducing information on or from the magnetic layer in relation to the exposure processing or printing of image frames of the filmstrip.

The present invention involves a magnetic read/write head support system for recording and/or reproducing information in relation to emulsion layer side image frames of a photographic filmstrip in a magnetic layer on the non-emulsion side of the photographic filmstrip advanced in a filmstrip transport direction through a filmstrip transport path. The term "read/write head" as used herein is intended to include read heads, write heads or read and write magnetic heads for recording and/or reproducing information in and/or from the magnetic layer. The system preferably comprises: a magnetic read/write head having a head gap and a curved head profile in the filmstrip transport direction of a predetermined curvature length supported on a first side of the filmstrip transport path; and compliant backer plate assembly means on a second side of the filmstrip transport path adapted to be advanced into an engaged position from a retracted position for urging the filmstrip magnetic layer against the curved profile over the curvature length with a high degree of compliance of the magnetic read/write head with the magnetic layer of the filmstrip without damaging the filmstrip magnetic or emulsion layers.

The compliant backer plate assembly further preferably comprises a frame, a flexible backer plate having first and second free ends separated by a flexible load bearing region extending along the filmstrip transport path adapted to be curved by bending against the filmstrip emulsion side over the curvature length, support means mounted to the frame for slidably engaging the first and second free ends of the backer plate for allowing relative movement of the backer plate with respect to the frame between a first position wherein the elongated load bearing region of the backer plate is substantially straightened and a second position wherein the elongated load bearing region of the backer plate is curved under bending pressure applied by the magnetic head through the filmstrip, and a resilient pad positioned between the frame and the flexible load bearing region for contacting the load bearing region when the load bearing region is curved under bending pressure and for altering the curvature thereof to restore compliance of the magnetic layer to the head gap when the magnetic read/write head and the compliant backer plate assembly means are in the advanced position.

ADVANTAGES OF THE INVENTION

In accordance with the present invention, and due to the various features thereof, the magnetic head-to-film interface in the film transport path enables compliance of the magnetic read/write head gap or gaps with the MOF layer. In addition, the invention provides a stable read/write interface insensitive to the transient nature of film tension, while the film is advanced from frame to frame. The parts of the backer plate assembly are simple and inexpensive to make and assemble. The backer plate and supporting frame are free to float so as to locate themselves to the apex of the magnetic head. The floating feature alleviates the need for precision parts to locate the bending forces precisely over the head gap.

BRIEF DESCRIPTION OF THE DRAWINGS

These and other objects, advantages and features of the invention will become apparent from the detailed description given hereinafter in relation to the accompanying drawings, in which.

Figure 1:
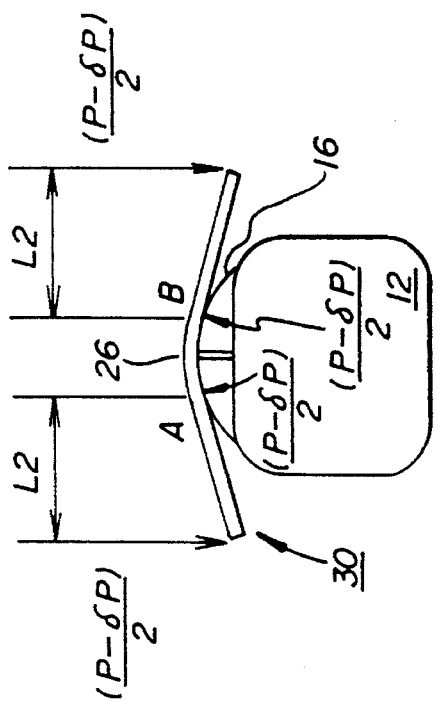
FIGS. 1 and 2 are schematic plan views of the bending moments of photographic filmstrip about a cylindrical read/write head illustrating the loss of full head-to-MOF layer compliance at the head gap.

The figures are not necessarily to scale.

DETAILED DESCRIPTION OF THE PREFERRED EMBODIMENTS

The present invention preferably employs a photographic filmstrip of the type described in detail in the above-referenced '873 patent, for example, incorporated herein by reference, having the optically transparent MOF layer continuously coated on the non-emulsion side of the filmstrip base. The photographic filmstrip is relatively thick and has a low flexibility. Also, when the photographic filmstrip is wound on a core or reel, it undergoes a plastic deformation and retains a curvature or core set (curl) after it is released from the core or reel. As relative humidity decreases, the amount of curl increases. Because of the relatively low flexibility, it is difficult to obtain a flat plane at the interface or line of contact of the MOF layer with the magnetic read/write head gap. The amount of curl can vary across the width of the photographic material.

A classical manner of contacting magnetic recording tape to a magnetic read/write head is to contour the head surface in the direction of the tape tracks and tape transport so that the head is essentially cylindrical. The magnetic head is positioned into the tape transport path, and the tape is transported over the head contour effecting an angle of wrap of the tape around the head contour. Typically, a backing support or backer plate to pressure the tape against the head is shown in the above referenced patents, including the '782 patent.

In the case of the above described photographic filmstrip, the inherent cross-curvature of the filmstrip and the high bending stiffness requires a high contacting force between the filmstrip and magnetic head to maintain the required contact of the head gap with the MOF layer. Wide or non-uniform spacing separations between the head gap and the MOF layer cannot be tolerated and result in lower recording density or a degraded signal. The act of bending the filmstrip around the head contour diminishes the cross-curvature at the bend, and makes the filmstrip in the bend region very stiff, such that compliance to the magnetic recording head is difficult to accomplish without applying excessive force. This excessive force results in scratching and damage to the MOF layer by the head and/or to the emulsion layer by the backing support.

It is a known that when a beam of constant cross-section (thickness and width) is loaded by a constant bending moment, e.g. equal and opposite couples at each end of the beam, the beam will deflect into an arc of a circle of radius R and that R=EI/M. In this relationship, E is Young's modulus for the beam material, I is the moment of inertia of the beam cross-section, and M is the value of the constant bending moment.

When a beam is centrally supported by a cylinder of radius $R_c$ and loads P/2 are gradually applied to the ends of the beam, the bending moment M at the central beam support gradually increases. The pressure P of the cylinder on the beam is evenly distributed across the beam as a "line load" applied to a "line contact". When the applied load P is increased so that the bending moment at the beam center reaches the critical magnitude $M_c=EI/R_c$, the curvature of the beam due to the loading is exactly the same as that of the cylinder over the small region in contact with the cylinder and a single line contact A remains extending across the width of the beam.

Figure 2:
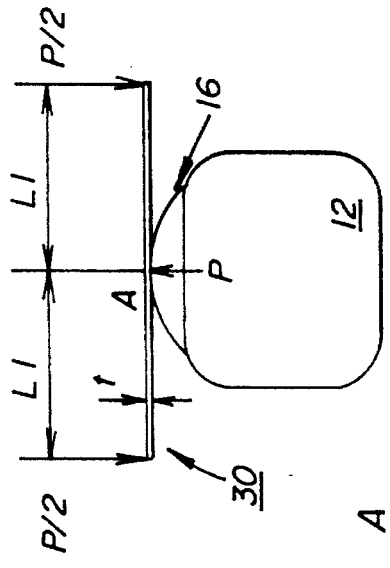

As the applied load P is increased, by a small amount δP, the beam (e.g. beam 30 of FIG. 2) deflects a little more, wrapping around the cylinder (e.g. the cylindrical head surface 16 in FIG. 2). The line load P of FIG. 1 splits into two line loads applied to two line contacts A and B separated by a space δL along the surface 16 as shown in FIG. 2. The beam segment between the two line contacts A and B experiences constant bending moment of the critical magnitude $M_c=EI/R_c$. Between the line contacts A and B, there are no P forces perpendicular to the beam.

This principle applies to the deflection of a beam-type backer plate 30 curved around a cylindrically contoured magnetic read/write head as schematically shown in FIGS. 1 and 2. It is this effect that apparently is sought in the above-referenced '782 patent to decrease loading at the head gap. FIG. 1 illustrates the application of the line load P in relation to a line contact A of a backer plate 30 against a cylindrical head surface 16 of a read/write head 12 having a radius R. Typically, the head gap is formed along the center line of the head 12 at the line contact A. FIG. 2 shows the two spaced apart line contacts A and B separated by space δL along the surface 16 and the line loads (P +δP)/2 applied to each line contact balanced by the same loads applied to the backer plate 30 free ends. No filmstrip is shown between the magnetic head surface 16 and the backer plate 30 in FIGS. 1 and 2.

When a filmstrip is introduced therebetween, the static relationship as shown in FIG. 1 is difficult to maintain. The anticlastic curvature of the filmstrip described above is generally sought to be overcome by bending the filmstrip around the cylindrical head surface. As described above with respect to FIGS. 1 and 2, the lines of contact result spaced apart from the head gap, whereby the force applied at the head gap is reduced to zero and separations occur. This effect is exacerbated in the context of edge recording by the fact that only the filmstrip edge is supported against the head surface 16 to record or read from the edge track or tracks of the MOF layer or stripe. In this context, the remaining width or the central image frame width of the filmstrip is not supported in order to prevent scratching in the image frame area. As tension is increased on the filmstrip bowed over the magnetic read/write head along one edge thereof, the central image frame region may collapse inward, causing the edge to separate from the curvature length of the head surface 16. The compliance between the head gap and the MOF layer of the filmstrip must be extremely close, particularly for the read operation due to the low density of the MOF layer, and this effect causes a loss of that compliance. Moreover, particularly in the recording context, filmstrip motion takes place in a frame stepping mode by means of a pulse of tension (i.e., jerking or jogging motion). When the pulse of tension is applied to a stationary filmstrip, the film tension or load conditions at the recording head/MOF layer interface are highly variable, compounding the problems associated with the non-planarity and noncompliance of the filmstrip.

Figure 3:
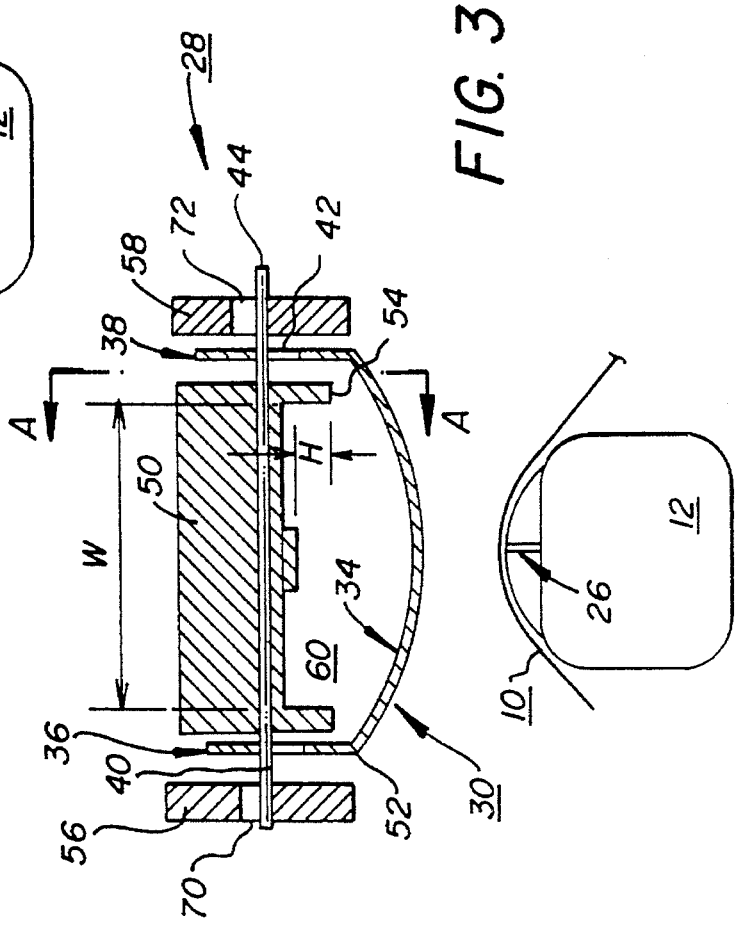
FIG. 3 is a front, partial cross-section, schematic view of the head backer assembly of the present invention in a spaced apart position with respect to the magnetic read/write head.
Figure 5:
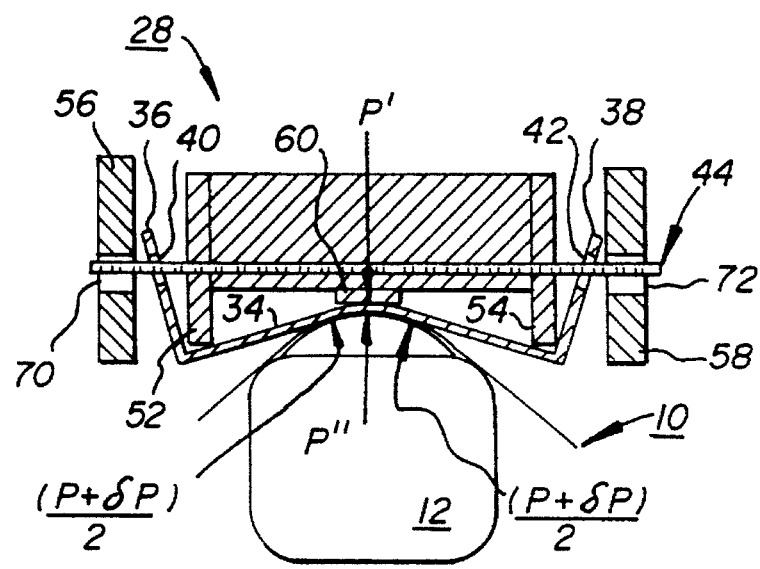
FIG. 5 is a front, partial cross-section, schematic view of the head backer assembly of the present invention in an engaged position with respect to the magnetic read/write head to achieve full head compliance with the MOF layer in the region of the head gap.

FIGS. 3 and 5 are schematic elevation views of a backer plate assembly 28 in accordance with the present invention in relation to a filmstrip 10 and magnetic head 12 particularly for use in edge track(s) reading operations. The flexible backer plate 30 is suspended for movement with respect to a movable member 50 when the magnetic head 12 and backer plate assembly 28 are moved between a spaced apart or retracted position (FIG. 3) and an engaged position (FIG. 5). For example, the magnetic head 12 may be supported in stationary support means with the filmstrip 10 wrapped around its cylindrical surface 16 in the filmstrip transport path, and the backer plate assembly 28 may be moved from a retracted or spaced apart position of FIG. 3 to the engaged position of FIG. 5, wherein the filmstrip 10 is engaged by the backer plate 30.

Alternatively, the assembly, when completed, may always be in the engaged position to receive a filmstrip between the backer plate 30 and the curvature length of the magnetic read/write head surface 16. The filmstrip may be advanced therebetween and force the backer plate 30 to separate sufficiently from the head surface to accommodate the filmstrip with the MOF layer contacting the magnetic head surface 16 and head gap 26. The filmstrip transport path may be effected by rollers engaging the edge of the filmstrip bearing the MOF layer track of interest at positions upstream and downstream of the magnetic head 12 location. The deflection of the filmstrip 10 around the magnetic head cylindrical surface 16 is exaggerated for emphasis.

Figure 6:
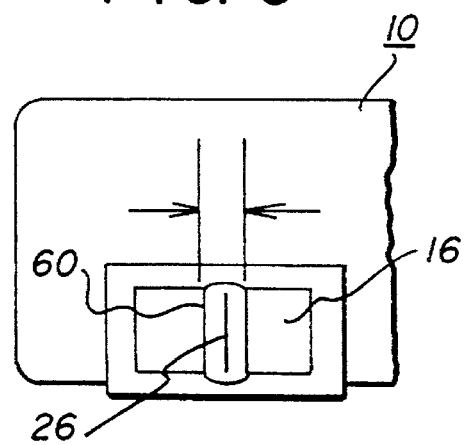
FIG. 6 is a schematic top view of the area of contact of the magnetic layer to the read/write head of FIG. 5.

The magnetic read/write head 12 has a width transverse to the curvature length of the surface 16 and a head gap 26 centrally located along the curved head profile in the film transport direction as shown also in FIG. 6. The curved head profile is cylindrical in this case and of a predetermined curvature length extending along the cylindrical head surface 16. The actual length may be on the order of 8 mm, and the radius may be on the order of 30 mm. The head gap 26 length and corresponding width of the head surface 16 may be on the order of 2 mm.

The backer plate 30 is elongated and of a width at least corresponding to the width of the magnetic head 12 in a straight or curved support region 34, when relaxed. In FIG. 3, the support region 34 is curved convexly toward the convex curved magnetic head surface 16. The concave curvature of the support region 34 is circular at least in the length corresponding to the length of the magnetic head surface 16. This ensures that support region 34 can be shortened so that when it is straightened (as shown in reference to FIGS. 8–10) or bowed into a concave curvature as shown in FIG. 5, it exerts a greater degree of force along the lines of contact that develop as described below.

First and second end tabs 36 and 38 extending away from the filmstrip 10 are formed at the free ends of the support region 34. The end tabs 36 and 38 include elongated slots 40 and 42, respectively, through which a support rod 44 extends for suspending the support region 34 so that it may be moved and bent as shown in FIG. 5 in the engaged position of the assembly.

The backer plate 30 is formed of a non-magnetizable polished, resilient material, e.g. stainless steel or an alloy that can readily flex, is long lasting and retains a polished finish to avoid scratching the filmstrip emulsion layer that it bears against in the engaged position. The backer plate material should be non-abrasive and non-tacky to allow smooth frictionless contact at the support/emulsion interface.

The backer plate assembly 28 is formed of an elongated movable member 50 having end plates or legs 52 and 54 (which may be fabricated as a single piece) at its ends that extend toward the backing plate 30 and the filmstrip transport path. The support rod 44 is extended through aligned bores in the legs 52, 54 and the movable member 50. The support rod 44 also extends through the elongated slots 40 and 42 in the backing plate tabs 36 and 38, respectively, so that the backing plate 30 has a degree of freedom of movement both toward and away from the magnetic read/write head surface 16 and pivotally as described below. The support rod 44 also extends through the elongated slots 70 and 72 in stationary support legs 56 and 58 (attached to other structure not shown in FIGS. 3–5) to allow a similar freedom of movement of the rod 44 and attached movable member 50 as shown in the engaged position of FIG. 5. The support legs 56 and 58 are spaced apart from the respective legs 52 and 54 so that the backer plate tabs 36 and 38 fit loosely between them in the spaced apart position of FIG. 3.

Figure 4:
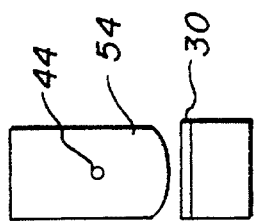
FIG. 4 is a side elevation schematic view of the head backer assembly of FIG. 3 taken along the lines A—A.

The backer plate 30 is free to rotate about its long axis on the rod 44 as shown in FIG. 4 and so aligns itself with the curved head surface 16 providing for even force distribution across the width of the magnetic head 12. The backer plate 30 rotation about the rod 44 also assures even pressure distribution across the width of the curved head surface 16 of predetermined curvature length. The head surface 16 length and width are shown in FIG. 6 in relation to an edge segment of a filmstrip 10.

As described above, the support rod 44 provides support means mounted to the movable member 50 for slidably engaging the first and second free ends or end tabs 36 and 38 of the backer plate 30 for allowing relative movement of the backer plate 30 with respect to the movable member 50. The freedom of movement can be between a first position wherein the elongated load bearing region 34 is substantially straightened or bowed convexly as shown and a second position wherein the elongated load bearing region 34 is curved by bending pressure applied by the magnetic head 12 through the filmstrip 10. A further freedom of movement is allowed by the movement of support rod 44 in elongated slots 70 and 72. This results in the two line loads applied to two line contacts A and B separated by a space δL along the surface 16 as shown in FIG. 2.

Returning to FIGS. 3 and 5, a resilient pad 60 is mounted to a lower surface of the elongated movable member 50 between the legs 52, 54. The pad 60 may be formed of a resilient solid rubber, a foam material, leaf spring or the like.

As shown in FIG. 3, the end plates or legs 52 and 54 extend further toward the backer plate 30 than the pad 60 by a dimension H to ensure a degree of bending of the central support region before contact is made with pad 60. In this case, the initially straight or convex (as shown) backer plate 30 is rendered concave due to the depth of the dimension H, the length W between legs 52 and 54, and the length of engagement, in the direction of filmstrip transport, of the curvature of head surface 16 with the filmstrip 10 and the backing plate support region 34.

Figure 7:
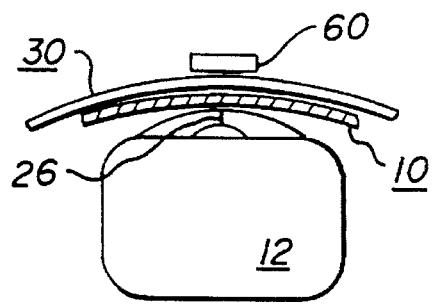
FIG. 7 is a further view of the area of contact of FIGS. 5 and 6.

As the backer plate assembly 28 is brought into the engaged position of FIGS. 5 and 7, the backer plate 30 lifts while guided and constrained by the slots 40 and 42 until the inside ends of the support region 34 contact the ends of legs 52 and 54. The backer plate 30 then flexes concavely until the inner surface of the support region 34 contacts pad 60. The distance W of the movable member 50 between the legs 52 and 54 and the difference in height H between the legs 52, 54 and the pad 60 are chosen with respect to the thickness t of the backer plate and the predetermined curvature length of head surface 16 so that the two spaced apart line contacts A and B are separated by a predetermined space δL along the surface 16, and the line loads (P+δP)/2 applied to each line contact are balanced by the same loads applied to the backer plate 30 free ends engaged against the stationary legs 56 and 58 (in the manner shown by the balanced loads of FIG. 2).

The backer plate 30 flexes over the head surface 16 making contact over the length spanning the head gap 26. Additional loading pressure P' is applied on contact of the backer plate 30 against the pad 60 to press and flatten the flexed support region 34 against the emulsion layer and to in turn close any spacing between the MOF layer and the magnetic head gap 26.

In this manner, the backer plate support region 34 is flexed to the head contour over a desired distance, e.g. 2 mm, on either side of the head gap 26, as shown in FIGS. 6 and 7. The filmstrip 10 is pressed against the magnetic read/write head surface 16 by the cumulative effect of the line loads (P+δP)/2 and the additional loading pressure P' as depicted in FIG. 5. A predetermined pressure distribution is achieved across the head gap 26 pressing the filmstrip between the support region 34 and the magnetic head surface 16. The ratio of the forces applied at contact lines A and B and at the head gap 26 is chosen by design and is adjustable by choosing suitable parameter values. For example, 50% of the total load may be applied force P' countered by the opposing force P" at the head gap 26. The remaining 50% of the force may be balanced at the line contacts A and B and the ends of the legs 52, 54 (as shown schematically in FIG. 2).

As shown, the flexible, load bearing, support region 34 extends along the filmstrip transport path and is curved by bending against the filmstrip emulsion side over the magnetic head surface curvature length. The backer plate assembly 28 thereby provides compliant backer support means on the filmstrip 10 emulsion side for urging the filmstrip magnetic layer against the curved magnetic head profile over the curvature length to achieve a high degree of compliance of the magnetic read/write head with the magnetic layer without damaging the filmstrip magnetic or emulsion layers.

In one preferred embodiment, the magnetic head and backer plate assemblies may be mounted for movement into and out of a filmstrip transport path from the side thereof to be aligned with one or more tracks in the MOF layer of the filmstrip in a filmstrip processing apparatus to read out recorded information in the tracks. Such filmstrips are commonly spliced end to end for processing and printing operations. The backer system of the present invention is flexibly mounted so as to provide for over travel when a splice or other obstruction is fed through the filmstrip transport path while the assembly is in the engaged position of FIG. 5.

Figure 8:
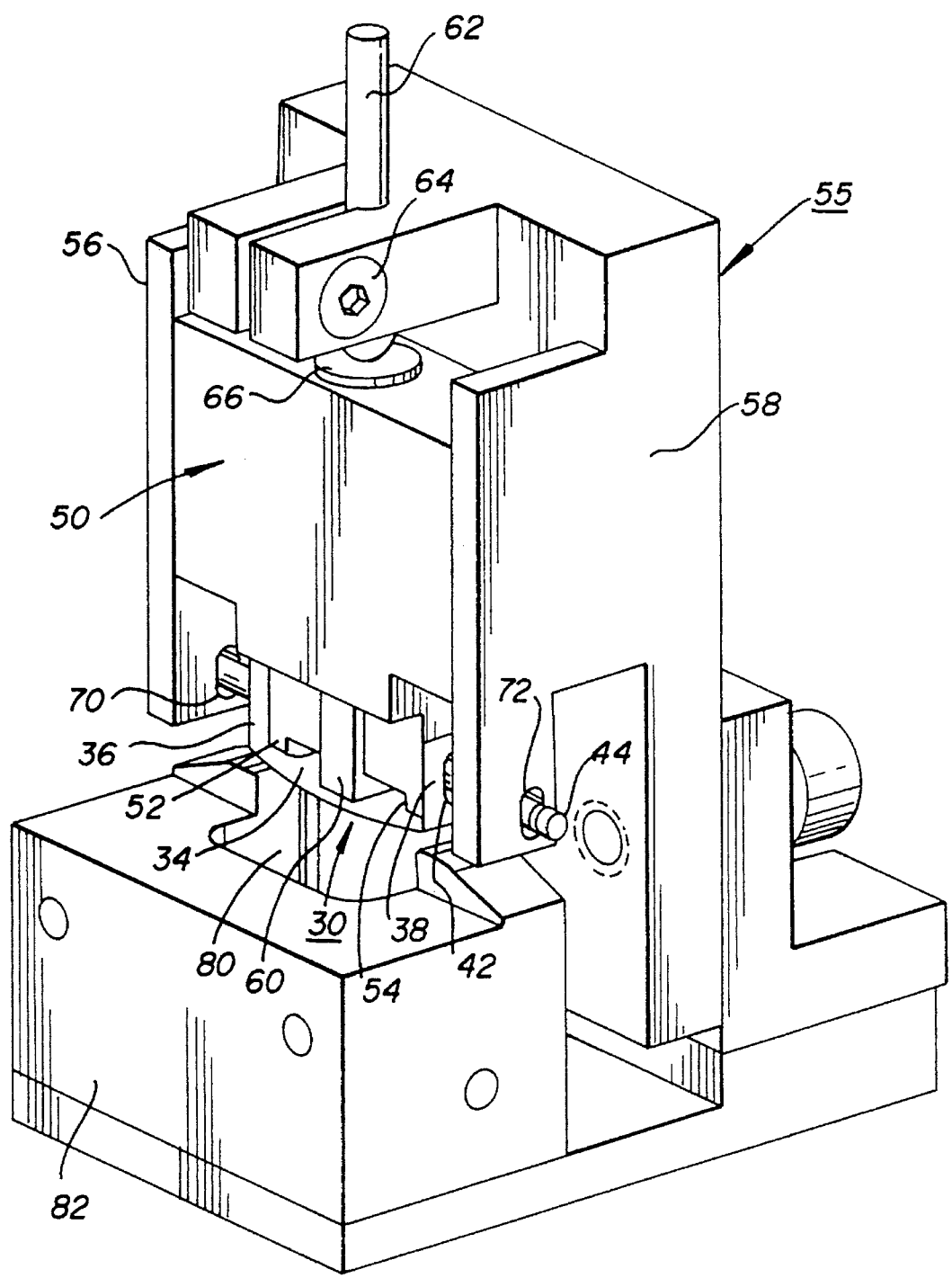
FIG. 8 is a perspective view of a read/write head support and backer assembly of the present invention utilizing the principles of FIGS. 3–5.
Figure 9:
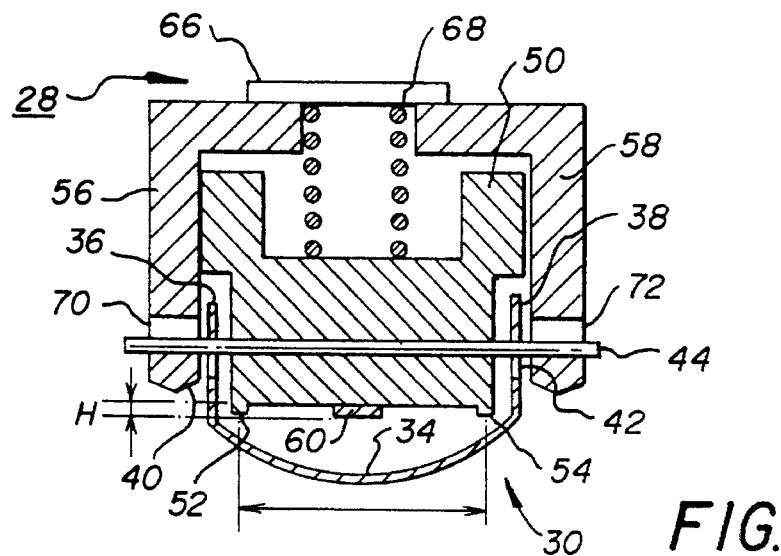
FIG. 9 is a front, partial cross-section, schematic view of the assembly of FIG. 6 with the backer assembly in a spaced apart position with respect to the magnetic read/write head.
Figure 10:
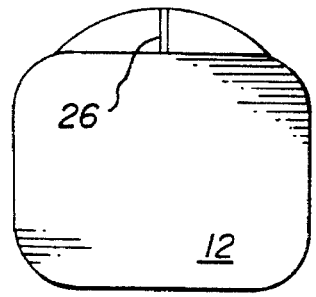
FIG. 10 is a front, partial cross-section, schematic view of the assembly of FIG. 6 in an engaged position with respect to the magnetic read/write head to achieve full head compliance with the MOF layer in the region of the head gap.
Figure 10:
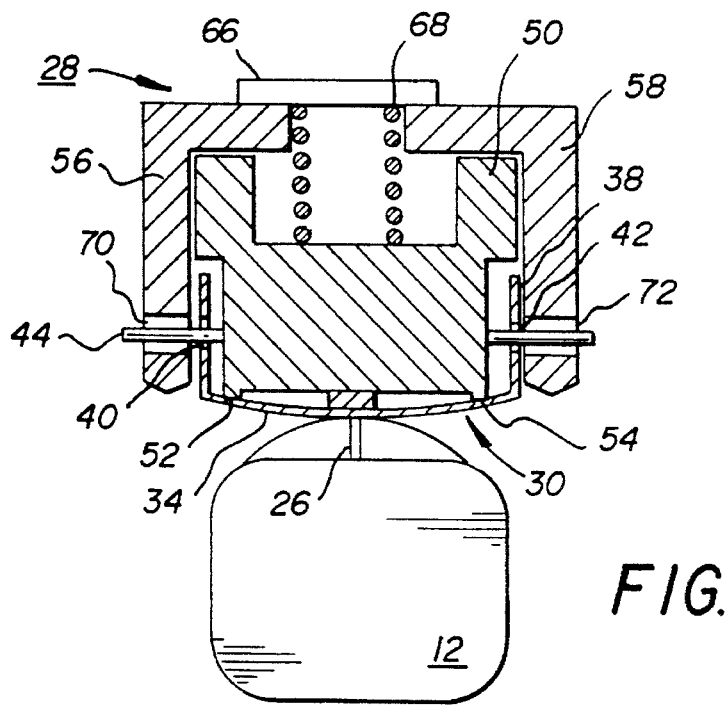

Turning to FIGS. 8–10, they illustrate such a system. In FIG. 8, the backer assembly 28 is shown in relation filmstrip edge transport path over a receptacle 80 in a head support 82 for receiving a magnetic read/write head (not shown). The support legs 56 and 58 extend from a stationary support frame 55 on either side of the movable member 50. The movable member 50 is spring loaded for up and down movement through the action of support rod 44 and slots 70 and 72 of the stationary support legs 56 and 58 as described above and is also capable of pivoting on the support rod 44. The pressure applied to the movable member 50 can be adjusted by a plunger 62 that is adjusted and tightened at screw 64 with respect to the stationary frame 55 to bear against the cap 66 of a spring 68 trapped internally in a bore within movable member 50 as shown in FIGS. 9 and 10. The end of the plunger 62 bearing against cap 66 is rounded so that the cap 66 can slip beneath it to allow inward and outward pivoting of the movable member 50 about support rod 44. The pivotal movement allows the attached legs 52 and 54 and the backer plate 30 to move inward or outward and to adjust to the angle of contact of the support region 34 with respect to the magnetic head surface 16 in the head width direction.

The height H is diminished with respect to the thickness of pad 60, so that the backer plate 30 remains slightly convex or straight in the engaged position of FIG. 10. In this variation, the pad 60 is replaced by a boss or extension 74 which is of the same material as the movable member 50, and is not flexible, but relatively rigid. The movable member 50 may be of plastic and so the extension 74 is of grater rigidity than the foam material that may be employed in the embodiment of FIGS. 3–7. The rigidity of pad extension 74 is not as significant as the control of the dimensions W and H. The same forces can be applied, but a shorter dimension W of the movable member 50 can be employed and still achieve the same effects of FIGS. 3–7.

When the magnetic read/write head is inserted into the receptacle 80 on the lower side of the filmstrip transport path, the head support 82 and the adjustable plunger 62 provides means for bringing the magnetic read/write head 12 and the compliant backer plate assembly 28 positioned on the upper side of the filmstrip transport path into the engaged position from the spaced apart position for urging the filmstrip magnetic layer against the curvature length of curved head surface 16.

The pivotal and up and down freedom of movement of the movable member 50 as well as the backing plate 30 on support bar 44 provides an inward or outward pivotal movement with respect to the fixed frame 55 and allows a self centering or continuous contact adjustment of the pad 60 and backing plate 30 to the head surface 16. The head surface 16, particularly across the width thereof, may not be precisely positioned when magnetic head 12 is secured into receptacle 80. In accordance with the present invention, it is not necessary to make fine adjustments to compensate for inexact positioning and alignment. The freedom of movements is provided to avoid interferences from occurring and to allow the self adjustment to occur.

The above described system may also be incorporated into a camera if enough space is available. A suitable camera system for recording information into and reproducing information from one or more spaced parallel tracks in the MOF layer employing such a filmstrip 10 may take the form depicted in the above-referenced '780 or '030 patents.

The apparatus disclosed can therefore be used with photographic filmstrip in drives, cameras, readers, and/or scanners. In addition, the apparatus disclosed may be duplicated and used to provide backing support to an array of two or more magnetic read/write heads arrayed across the width of the filmstrip.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–10 filmstrip 10
magnetic read/write head 12
cylindrical head contoured surface 16
spaced lines of contact 22, 24
elongated read/write head gap 26
backer plate assembly 28
flexible backer plate 30
support region 34
first and second end tabs 36 and 38
elongated slots 40 and 42
support rod 44
movable member 50
plates or legs 52 and 54
stationary support frame 55
stationary support legs 56 and 58
resilient pad 60
plunger 62
screw 64
cap 66
spring 68
elongated slots 70 and 72
receptacle 80
head support 82

I claim:

1. In a magnetic read/write head support system for recording and/or reproducing information in relation to emulsion layer side image frames of a photographic filmstrip in a magnetic layer on the non-emulsion side of said photographic filmstrip advanced in a filmstrip transport direction through a filmstrip transport path, said system comprising:

a magnetic read/write head having a curved head surface of a predetermined curvature length in said filmstrip transport direction and width transverse to said filmstrip transport direction and further having a head gap extending across said width;

means for supporting said magnetic read/write head on a first side of said filmstrip transport path for engagement against said magnetic layer; and means for bearing against said filmstrip emulsion surface and urging said magnetic layer against said curved head surface over said curvature length with a high degree of compliance of said magnetic read/write head with said magnetic layer of said filmstrip without damaging the filmstrip magnetic or emulsion layers further comprising:

beam means supported at the ends thereof in relation to said emulsion layer for bending and complying to pressure applied through said filmstrip by said curved head surface against said beam means such that first and second line loads are applied to said emulsion layer to effect first and second respective contact lines extending across the width of said curved head surface and spaced apart on either side of said head gap, whereby said head gap is essentially not loaded; and pad means positioned to engage said beam means opposite to said head gap for altering the loading thereof to restore a load on said head gap when said magnetic read/write head and said beam means are in an engaged position.

2. In a magnetic read/write head support system for recording and/or reproducing information in relation to emulsion layer side image frames of a photographic filmstrip in a magnetic layer on the non-emulsion side of said photographic filmstrip advanced in a filmstrip transport direction through a filmstrip transport path, said system comprising:

a magnetic read/write head having a head gap and a curved head surface of a predetermined curvature length in said filmstrip transport direction and width transverse to said filmstrip transport direction;

means for supporting said magnetic read/write head on a first side of said filmstrip transport path; and a compliant backer plate assembly positioned on a second side of said filmstrip transport path adapted to be brought into an engaged position for urging said filmstrip magnetic layer against said curved head surface over said curvature length with a high degree of compliance of said magnetic read/write head gap with said magnetic layer of said filmstrip without damaging the filmstrip magnetic or emulsion layers, said compliant backer plate assembly further comprising:

a stationary support frame;

a movable member;

a flexible backer plate having first and second free ends separated by a flexible load bearing region extending along said filmstrip transport path adapted to be curved by bending against said filmstrip emulsion side over said curvature length;

support means mounted to said movable member and said stationary frame for slidably engaging said first and second free ends of said backer plate between said movable member and said stationary frame for allowing relative movement of said backer plate with respect to said movable member between a first position wherein the flexible load bearing region of said backer plate is relaxed and a second position wherein the flexible load bearing region of said backer plate is curved by bending pressure applied through said filmstrip by said magnetic read/write head in said engaged position such that first and second line loads are applied to contact lines extending across said magnetic read/write head and spaced apart on either side of said head gap, whereby said head gap is essentially not loaded; and a pad positioned between said movable member and said flexible load bearing region for contacting said load bearing region between said first and second contact lines when said load bearing region is curved by bending and for altering the loading thereof to restore a load on said head gap when said magnetic read/write head and said compliant backer plate assembly are in said engaged position.

3. The head support system of claim 2 wherein said flexible load bearing region of said backer plate is curved convexly when in said first position and is curved concavely by bending against a filmstrip overlying said curved head surface when in said second position.

4. The head support system of claim 3 wherein said stationary frame further comprises means for receiving said support means for allowing relative movement of said movable member with respect to said stationary frame.

5. The head support system of claim 4 further comprising means for biasing said movable member with respect to said stationary frame and means for allowing pivotal movement of said movable member on said support means to effect an inward or outward angular displacement of said movable member and said backer plate across the width of said curved head surface to provide self centering contact across said curved head surface width.

6. The head support system of claim 5 wherein said support means mounted to said movable member and said stationary frame for slidably engaging said first and second free ends of said backer plate between said movable member and said stationary frame further comprises means for allowing relative movement of said backer plate inward and outward with respect to said stationary frame and said movable member to laterally position said load bearing region with respect to said curved head surface width and said pad.

7. The head support system of claim 2 wherein said stationary frame further comprises means for receiving said support means for allowing relative angular pivotal movement of said movable member on said support means with respect to said stationary frame to effect an inward or outward angular displacement of said movable member and said backer plate across the width of said curved head surface to provide self centering contact across said curved head surface width.

8. The head support system of claim 7 further comprising means for biasing said movable member and said backer plate with respect to said stationary frame and toward said curved head surface in said engaged position.

9. The head support system of claim 8 wherein said support means mounted to said movable member and said stationary frame for slidably engaging said first and second free ends of said backer plate between said movable member and said stationary frame further comprises means for allowing relative movement of said backer plate inward and outward with respect to said stationary frame and said movable member to laterally position said load bearing region with respect to said curved head surface width and said pad.

10. In a magnetic read/write head support system for recording and/or reproducing information in relation to emulsion layer side image frames of a photographic filmstrip in a magnetic layer on the non-emulsion side of said photographic filmstrip advanced in a filmstrip transport direction through a filmstrip transport path, said system comprising:

a magnetic read/write head having a head gap and a convex curved head profile in the filmstrip transport direction of a predetermined curvature length and width supported on a first side of the filmstrip transport path; and compliant backer plate assembly means on a second side of the filmstrip transport path adapted to be advanced into an engaged position for urging the filmstrip magnetic layer against the curved profile over the curvature length with a high degree of compliance of the magnetic read/write head gap with the magnetic layer of the filmstrip without damaging the filmstrip magnetic or emulsion layers)said compliant backer plate assembly means further comprising:

a flexible backer plate having a convex curvature;

means for supporting said flexible backing plate in relation to said magnetic read/write head such that the backer plate convex curvature faces the magnetic read/write head convex curvature and flexible backing plate is bent into a concave curvature over at least a portion of said predetermined curvature length by engagement with a filmstrip extending therebetween such that first and second line loads are applied to said filmstrip first surface to effect first and second respective contact lines extending across the width of said curved head surface and spaced apart on either side of said head gap, whereby said head gap is essentially not loaded; and means positioned to restrain movement of said flexible backing plate opposite to said head gap for altering the loading thereof to restore a load on said head gap when said magnetic read/write head and said beam means engage said filmstrip.

11. The system of claim 10 wherein:

said flexible backing plate is formed with a convex supporting region separating first and second ends; and said support means further comprises means for supporting said first and second ends for allowing pivotal movement of said supporting region for self centering alignment with said magnetic read/write head width.

* * * * *